United States Patent [19]
Heavlin

[11] Patent Number: 5,724,251
[45] Date of Patent: Mar. 3, 1998

[54] SYSTEM AND METHOD FOR DESIGNING, FABRICATING AND TESTING MULTIPLE CELL TEST STRUCTURES TO VALIDATE A CELL LIBRARY

[75] Inventor: William D. Heavlin, San Francisco, Calif.

[73] Assignee: Advanced Micro Devices, Inc., Sunnyvale, Calif.

[21] Appl. No.: 480,788

[22] Filed: Jun. 7, 1995

[51] Int. Cl.⁶ .................................................. G06F 17/50
[52] U.S. Cl. .......................... 364/491; 364/488; 364/489; 364/490
[58] Field of Search .................................. 364/488–491

[56] References Cited

U.S. PATENT DOCUMENTS

| | | | |
|---|---|---|---|
| 5,387,810 | 2/1995 | Seta et al. | 257/370 |
| 5,406,497 | 4/1995 | Altheimer et al. | 364/489 |
| 5,572,437 | 11/1996 | Rostoker et al. | 364/489 |

OTHER PUBLICATIONS

"Validating An ASIC Standard Cell Library", by W. Agatstein et al. 1990.

"Dual Space Algorithms for Designing Space–Filing Experiments", by William D. Heavlin et al. Jun., 1994.

Kim et al. "High Performance CMOS Macromodule Layout Synthesis," IEEE 1994, pp. 179–182.

Wu et al. "Over–the–Cell Routers for New Cell Model," IEEE, 1992, pp. 604–607.

Lau et al. "M3D11: A Configurable Multilayer Router for Compact Custom Cell Design," IEEE, 1991, pp. 1928–1931.

Primary Examiner—Vincent N. Trans
Assistant Examiner—Vuthe Siek

[57] ABSTRACT

A system and a method for designing, fabricating and testing multiple cell test structures validate a cell library. Each test structure includes a plurality of logic layers where outputs of a logic layer are connected only to the inputs of a succeeding logic layer. In contrast to the conventional design method, mismatches in each logic layer are increased to assure extreme conditions in the test structure. For each logic layer, the number of fan-outs of each output from the previous logic layer is specified, and the number of basic cells in each layer is based on the number of inputs of the test structure. Based on D-optimality and maximum fan-in resolution, an assignment for connecting each fan-out and each fan-in is determined. Alternatively, a design repair algorithm can be used to make such an assignment. Each output of each logic cell in the logic layer is then assigned a length using D-optimality. The predicted propagation delays of a designed test structure are compared to the actual propagation delays of a fabricated test structure. The above is repeated for designing, fabricating, and testing multiple cell test structures to validate the cell library.

21 Claims, 5 Drawing Sheets

HISTOGRAMS BY FAN-IN

| AND | | LA,LN,MUX | |
|---|---|---|---|
| 6 | IIIII IIIII IIIII | 6 | I |
| 5 | IIIII IIII | 5 | I |
| 4 | IIIII | 4 | |
| 3 | II | 3 | I |
| 2 | I | 2 | II |
| 1 | | 1 | |

| NAND | | BF & INS | |
|---|---|---|---|
| 6 | IIIII IIIII IIIII | 6 | |
| 5 | IIIII IIII | 5 | |
| 4 | IIIII | 4 | |
| 3 | II | 3 | |
| 2 | I | 2 | |
| 1 | | 1 | II |

| NOR | | DF | |
|---|---|---|---|
| 6 | IIIII IIIII IIIII | 6 | |
| 5 | IIIII IIII | 5 | |
| 4 | IIIII | 4 | |
| 3 | I | 3 | I |
| 2 | II | 2 | II |
| 1 | | 1 | |

| OR | | XN & XOR | |
|---|---|---|---|
| 6 | IIIII IIIII IIIII | 6 | |
| 5 | IIIII IIII | 5 | |
| 4 | IIIII | 4 | |
| 3 | II | 3 | |
| 2 | I | 2 | II |
| 1 | | 1 | |

SYSTEM AND METHOD FOR DESIGNING, FABRICATING AND TESTING MULTIPLE CELL TEST STRUCTURES TO VALIDATE A CELL LIBRARY

TECHNICAL FIELD

The present invention relates to circuits or semiconductor devices, and in particular, to cell libraries used to design integrated circuits or devices for fabrication.

BACKGROUND ART

Figure 1A:
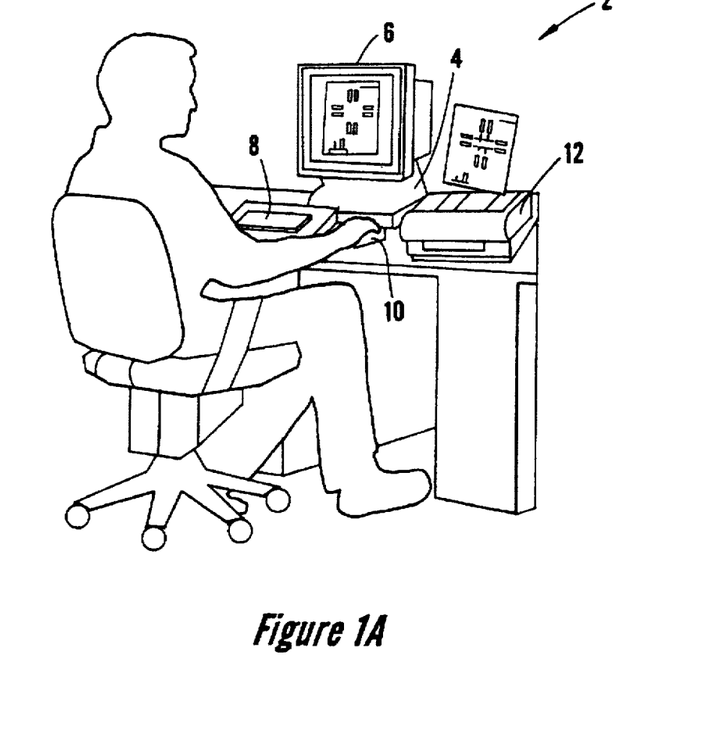
FIG. 1A illustrates a CAD tool program implemented in a computer station.

Prior to fabricating an integrated circuit, an engineer usually constructs a schematic using a computer aided design (CAD) tool such as ECAD, HSPICE, Verilog, etc, at a computer station 2, as illustrated in FIG. 1A. The CAD tool program is stored in the hard-disk of the computer station 2. The computer station 2 may comprise a microcomputer 4 with a display screen 6 and a keyboard 8, a mouse 10 and a printer 12.

Figure 1B:
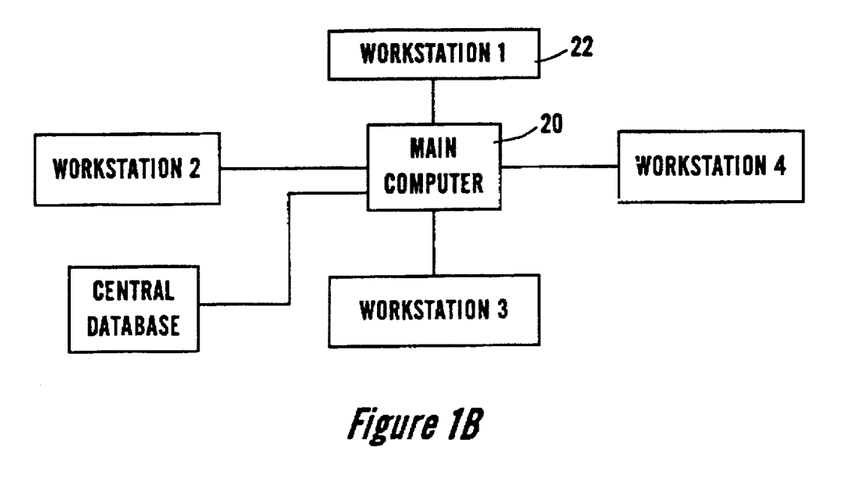
FIG. 1B illustrates a CAD tool program implemented in a central server connected to a plurality of work stations.

Alternatively, the CAD tool can be utilized using a central computer (a server) 20 connected to a plurality of work stations 22, as illustrated in FIG. 1B. The server and each work station are given a unique name for identification. The work stations may be UNIX SUN work stations; however, as can be appreciated, these work stations can be any work stations such as HP, IBM, STACK, etc. X-Window may be used to process data, wherein programs and all the processing of data are run in the server, but the program output is displayed at the work station, i.e., the work station is a display server. With X-Windows, a program can be easily updated in the server, rather than in every work station. A detailed description of such a scheme is shown in a commonly assigned U.S. application Ser. No. 08/384,262 filed Feb. 6, 1995 now U.S. Pat. No. 5,608,638.

Once the designer initiates the CAD tool program after proper protocol, an interface created by the program is displayed on the screen. The interface allows the user to access a cell library and to construct a schematic of an integrated circuit using the various basic logic cells available in the cell library. Methods of operating cell libraries and of realizing large scale integrated circuits are described in U.S. Pat. Nos. 5,387,810 and 5,406,497.

To create such a library, each cell is a previously designed, fabricated, and tested logic cell. For example, each type of logic cells is first designed using the CAD tool. The CAD tool then predicts the response of the designed logic cell, to one or more input signals and in particular predicts the propagation delays of the output signal relative to the input signals. Based on the schematic of the CAD tool, the designed cell is fabricated on semiconductor substrate, e.g., silicon, gallium arsenide, etc, and then packaged to form a packaged device.

Thereafter, under the same conditions specified to arrive at the CAD predictions, input signals are applied to the packaged cell to measure the actual propagation delays of the output signal. As can be appreciated, sometimes the actual propagation delays closely match the CAD predicted propagation delays, and other times the delays may differ. When the actual and predicted delays differ, the user, knowing the characteristic of various components and transistors, retests and recharacterizes the logic cell(s) and/or recalibrates elements of the CAD system until the predicted propagation delays match the actual propagation delays. The various cells in the cell library are cells which have been previously designed, fabricated, and tested so that the predicted propagation delays match the actual propagation delays.

Using such a library of cells, the user can design various integrated circuits. However, the user acknowledges that the CAD predictions have limited accuracy. Hence, when designing such integrated circuits, the user incorporates various compensating circuits to clean the signals which may be degraded due to noise. Further, when a logic cell output is inputted to numerous inputs of other cells, i.e., a large fan-out, the user selects a cell with a transistor which can send the output signal to such a large number of inputs. Such a large fan-out requires the cell to have a large transistor channel width.

As the complexity of the designed integrated circuits increase, it is uncertain whether the CAD tool can accurately predict the results of the integrated circuits fabricated on semiconductor. With a limited accuracy, the user is handicapped in designing complex integrated circuits. Such uncertainty arise from increased number of connections, increased capacitances, increased size, etc. Alternatively, there may be uncertainties in the CAD predictions of the propagation delays as integrated devices become faster and fabrication processes become more complex.

Figure 2:
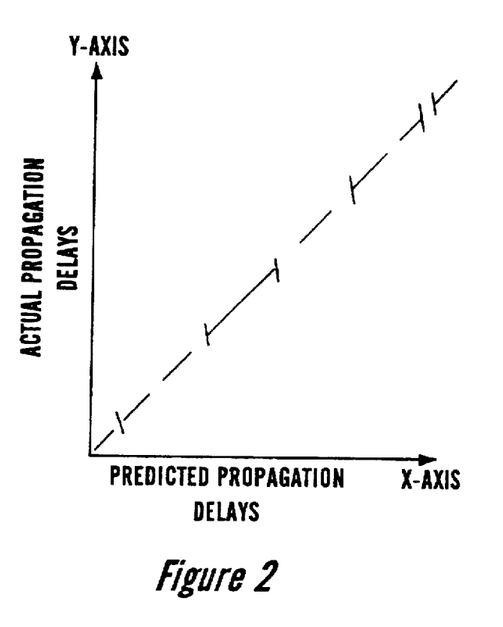
FIG. 2 is a graph illustrating a correspondence between the predicted propagation delays and the empirical or actual propagation delays of an integrated circuit designed, fabricated and tested using a cell library.

FIG. 2 is a graph illustrating a correspondence between the predicted propagation delays and the empirical or actual propagation delays. The X-axis represents the propagation delays predicted by the CAD tool, and the Y-axis represents the propagation delays measured in the actual integrated circuit. However, as shown in the solid lines, the accuracy or correspondence between the predicted and actual propagation delays of integrated circuits constructed using the cell library is limited only within a certain range. In addition, FIG. 2 illustrates a correspondence consisting of a single line.

It is uncertain what correspondence exists beyond the limited range, as shown in the dotted line of FIG. 2. Also, even in the limited range, the correspondence between predicted and actual delays may consist of two lines, a family of lines, or even a rough scatter. As the propagation delays become shorter due to faster transistors or propagation delays become longer due to more complex integrated circuits, the user does not know whether the CAD propagation delays will accurately predict the propagation delays of the actual integrated circuit. In other words, the cell library must be validated to confirm that the CAD tool will accurately predict the results over both ends of the extremes, i.e., vary fast integrated circuits and very complex integrated circuits.

Hence, there is a need to validate a cell library to determine whether CAD predictions are accurate for fast and/or complex integrated circuits designed using the cell library. Without such validation of a cell library, substantial time is expended in designing, testing and fabricating an integrated circuit. Without this accuracy, a user cannot be guaranteed that a successful simulation will result in a functional device. There is a need to accurately portray the performance of the library, and ensure that the designed integrated circuits are functional and meet the timing requirements, such as propagation delays. Without such a process to validate the cell library, evaluations of the fabricated integrated circuit with the designed integrated circuit can be ad hoc, circuit-specific, repetitive and costly.

In an article entitled "Validating an ASIC Standard Cell Library," Agastein et al. discloses a method for validating a cell library used by Intel. Although accuracy of the cell library assessment is improved, such a method also has limited accuracy. This method is less sensitive to the interactions among cells and interactions within cells relative to the inputs. Further, the method utilizes only 120 different types of basic cells, and is not easily scalable to larger libraries having over a thousand different cells. Moreover, since one bond pad is assigned to each single cell chain, a large number of bond pads is required for this method. For these reasons, in the context of FIG. 2, the method of Agastein et al. assesses the cell library over a range narrower than that likely to be used by any designed circuit. Further, due to potential, undetected interactions, their method may identify only one actual delay-predicted delay curve, in situations where multiple curves are actually present.

DISCLOSURE OF THE INVENTION

An advantage of the present invention is an improved cell library validation used to design an integrated circuit.

Another advantage of the present invention is in producing validation system and method which are scalable for larger cell libraries.

Another advantage of the present invention is in validating a library of a CAD tool for greater range of accuracy in extreme conditions.

Another advantage of the present invention is in reducing the number of bond pads required for validation of the cell library.

A further advantage of the present invention is in reducing the need for semiconductor circuit-level verification.

A still further advantage of the present invention is in decreasing the cycle time to bring an integrated circuit to the commercial market.

A further advantage of the present invention is in identifying variances between the predicted propagation delays and the actual propagation delays.

Still a further advantage of the present invention is in challenging the CAD predictions by operating in different physical regimes of predicted and actual propagation delays.

Additional advantages, advantages and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

According to the present invention, the foregoing and other advantages are achieved in part by a system and a method for designing, fabricating and testing multiple cell test structure to validate a cell library. To design each test structure, a plurality of logic layers is created with outputs of a logic layer being connected only to the inputs of a succeeding logic layer. In contrast to the conventional design method, mismatches in each layer are increased to assure extreme conditions in the test structure.

For each logic layer, the number of fan-outs of each output from the previous logic layer is specified, and the logic cells from all families having extreme properties are selected. Examples of extreme cell properties are transistor size, fan-in, etc. The number of logic cells in each layer is based on the number of inputs to the test structure. Further, the total number of fan-ins of the cells in the logic layer equals the number of fan-outs from the previous logic layer so that each fan-out is connected to one and only one fan-in. Based on D-optimality and maximum fan-in resolution, a (perhaps, random) assignment for connecting the each fan-out and each fan-in is determined. Alternatively, the design repair algorithm, which follows a best-of-random assignment with a systematic consideration of swapping all fan-in-fan-out pairs, can be used to determine such an assignment. Each output of each logic cell in the logic layer is then assigned a length using D-optimality.

Signals are then applied at the input bond pads of the test structure, and the CAD tool predicts the propagation delays at the output bond pads of the test structure. The results of the predicted propagation delays are stored on a hard disk of a computer. Thereafter, the designed test structure is fabricated on a semiconductor substrate. The fabricated test structure is tested by applying the same input signals at the input bond pads to measure the actual propagation delays at the output bond pads. The predicted propagation delays are compared to the actual propagation delays. The above is repeated to design, fabricate, and test multiple cell test structures to validate the cell library.

BRIEF DESCRIPTION OF THE DRAWINGS

The invention will be described in detail with reference to the following drawings in which like reference numerals refer to like elements wherein.

BEST MODE FOR CARRYING OUT THE INVENTION

Figure 3:
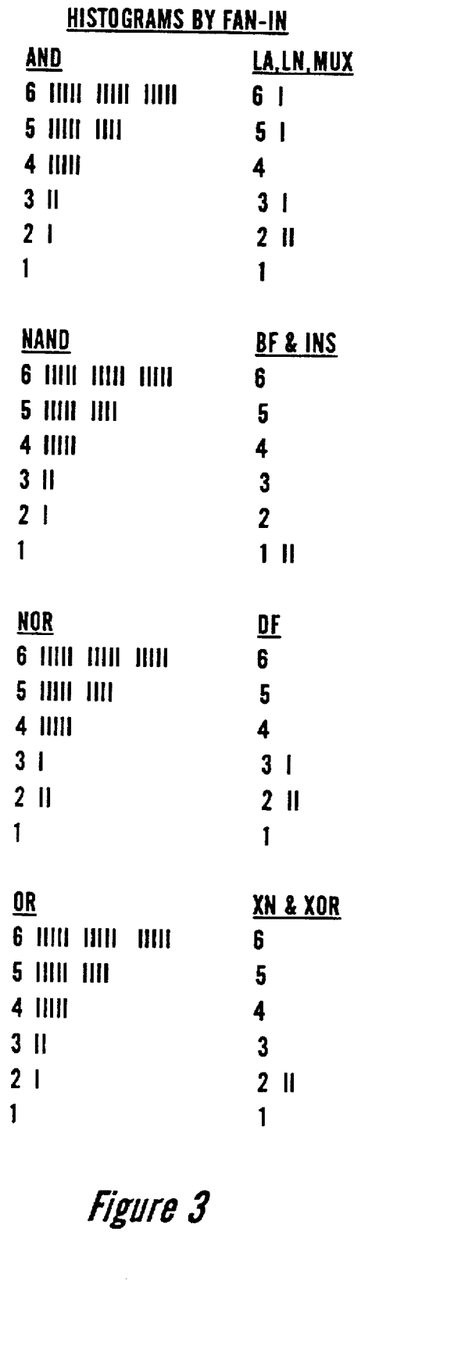
FIG. 3 depicts histograms based on fan-in (number of inputs) of families of various logic cells available in a cell library.

FIG. 3 depicts histograms based on fan-in (number of inputs) of families of various logic cells available in a particular cell library. In this particular cell library, there are eight families of logic cells. The eight families are AND, NAND, NOR, OR, MUX (multiplexer), BF (buffer) & INS (inverters), DF (D-Flip Flop) and XNOR & XOR logic cells. Within each family, there are different types of the logic cells. The numerals in the histograms indicate the number of inputs or fan-ins, and the vertical strokes "1" indicate the number of different types of the logic cells with a particular number of fan-ins. For example, in the AND logic circuit family, there are fifteen (15) different types of six input (fan-in) AND gates. Further, within each family, each cell has different properties or demographics. The important demographics are the cell's fan-ins and size. Although not shown in the histograms, the total number of logic cells within this library is over 1200. (For this cell library, each cell has only one output; however, the invention does not require this restriction.)

The present invention creates a test structure which will confirm the linearity of a correspondence between the predicted and actual propagation delays including the slope of the line and the intercept of the line. The test structure, which operates at the extreme of the predictions, is fabricated and tested to confirm its propagation delays against predicted propagation delays. Preferably, the line should have a slope of 1 and an intercept at zero. If not, the test structure allows the user to identify the difference and provides important data for detailed analysis of its origin.

Figure 4:
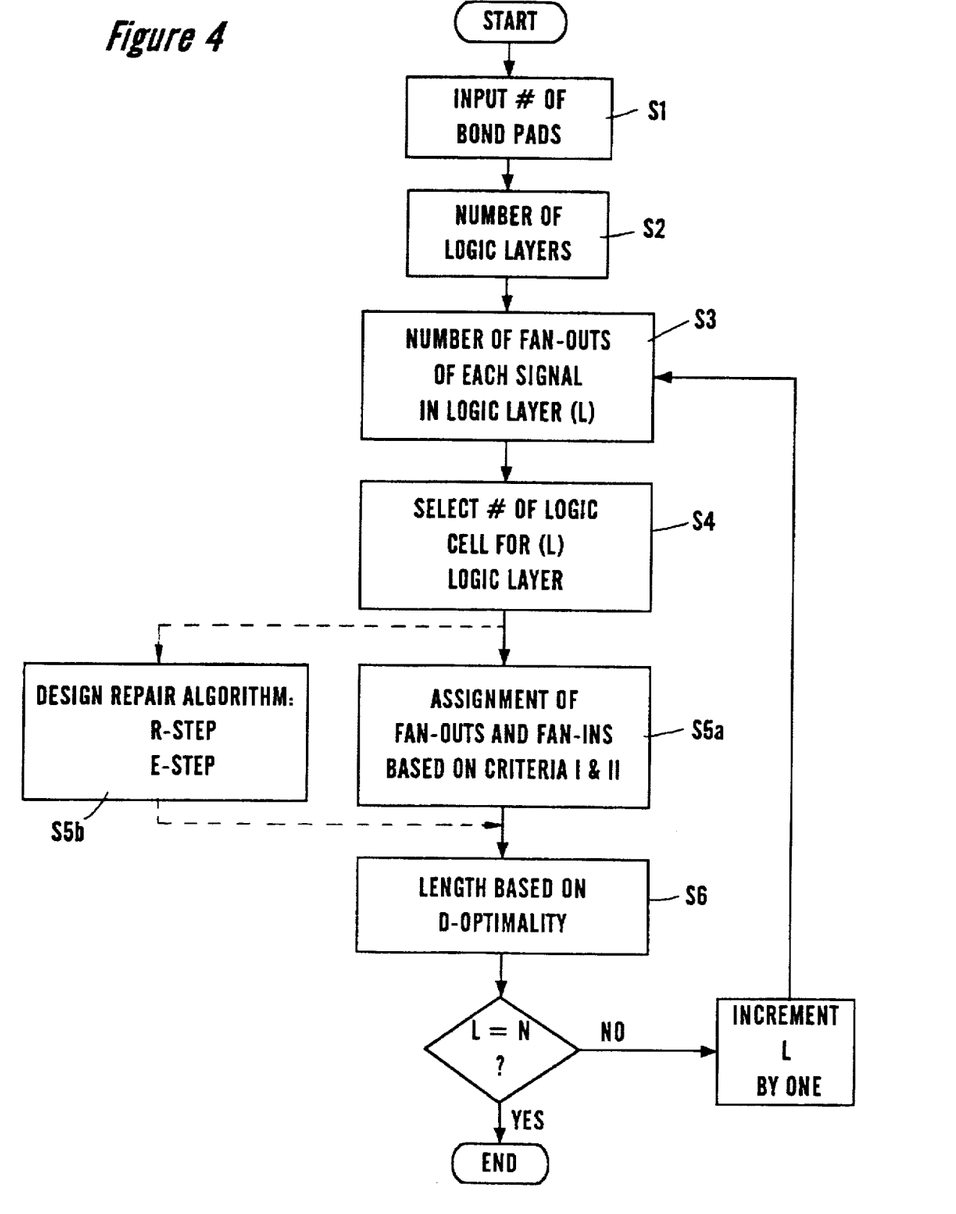
FIG. 4 is a flow chart illustrating the designing process of the a test structure.

FIG. 4 is a flow chart illustrating the design process of a test structure used to validate a cell library. The present invention creates an interface for designing a test structure to be fabricated on the semiconductor. When the user accesses the program, the user indicates the number of bond pads (S1). Such a determination is based on packaging of an integrated circuit, since the user desires to fabricate a device which can be packaged. (The propagation delays of packaged devices are more accurately assessed than those of unpackaged units.) Generally, the number of bond pads is 250. However, such a number can increase or decrease based on the designer's needs, and the packages available.

If there are 250 bond pads, the computer determines that half of the bond pads are used for inputs and the other half for outputs. Based on the 125 inputs and outputs each, the program determines that generally half of those bond pads are used for connections to various control signals. (This reserves half of available bond pads for other test structure applications. The most likely supplementary structures are single element structures such as transistors, capacitors, and resistors of various sizes. These structures facilitate parameter extraction of parameters used as inputs to CAD tools and can be used to refine the CAD tool predictions.) Hence, the computer establishes that there are 64 inputs and 64 outputs for the test structure. Such a test structure need not perform any specific function or be a circuit which is fabricated for commercial purpose. A designed test structure using the cell library needs only accurately predict the propagation delays of the fabricated test structure at the extreme conditions.

Thereafter, the program creates a plurality of logic layers based on a number of logic cells an input signal may go through before the integrated circuit outputs an output signal based on the input signal (S2). For example, an input signal may processed by 20 to 30 logic cells prior to an output signal being generated. Based on the user's need, the number of logic layers can be varied. For illustrative purposes, the program creates 20 logic layers, where logic layer 1 includes the fan outs of the inputs signals from the bond pads, and logic layer 20 includes the output signals of the test structure.

Figure 5:
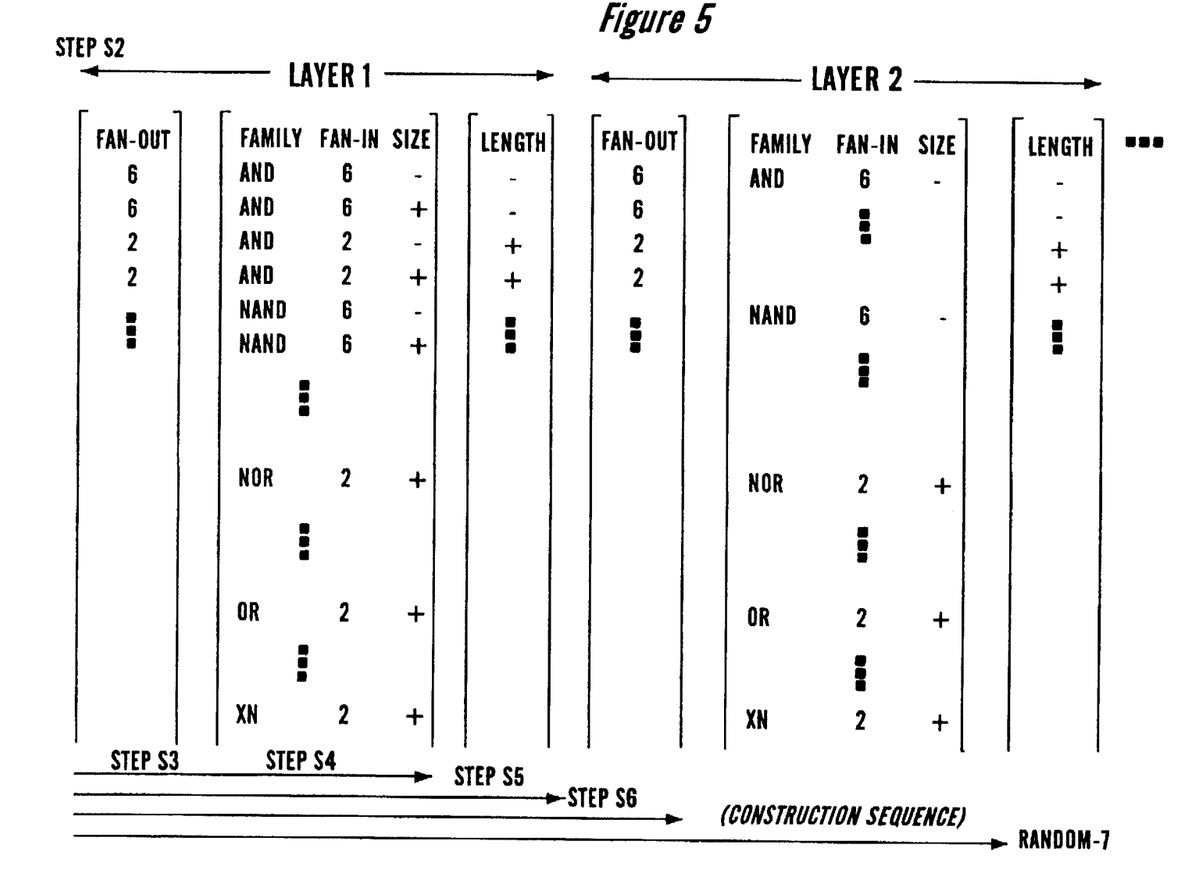
FIG. 5 illustrates the construction sequence of logic layers 1 and 2.
Figure 6:
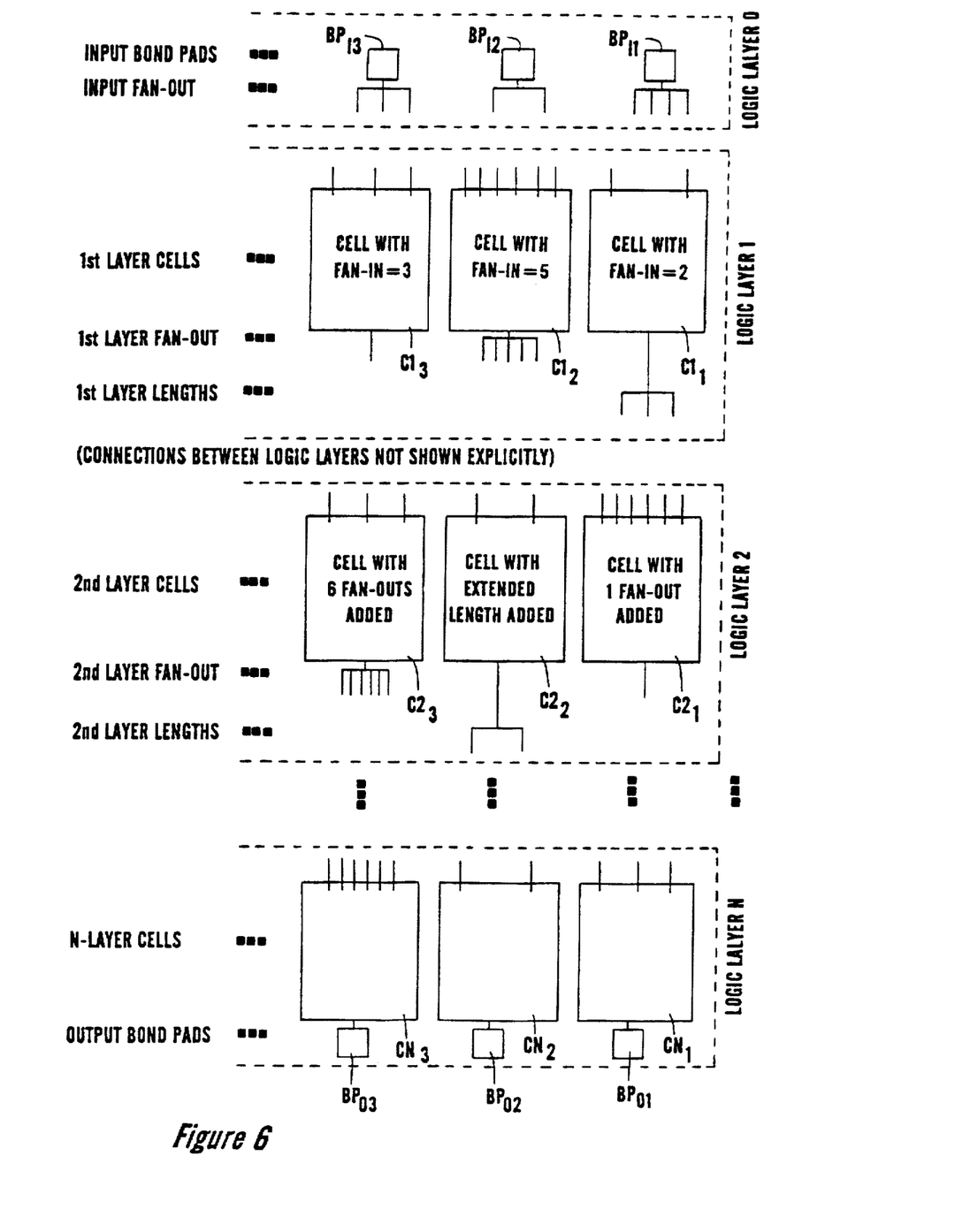
FIG. 6 is a shematic of logic layers 0 to N in a test structure which is created by the CAD tool based on a construction sequence.

FIG. 5 illustrates a construction sequence of logic layers 1 and 2 and the respective connections, and FIG. 6 is a schematic of logic layers 0 to N in a test structure which is created by the CAD tool based on the construction sequence. Logic layer 1, for example, includes the fan-outs of the input bond pads ($BP_{f1}-BP_{f64}$) to which the input signals are applied. The user or the program specifies the number of fan-outs of the input signal at each bond pad (53). In other words, the fan-outs indicate how many times each input signal of the bond pad is used as inputs to logic cells in the first logic layer. For example, the input signal at bond pad 1 is fanned-out six times to be used as inputs to six different logic cells in logic layer 1.

Using the cells available in the families of the cell library, as illustrated in FIG. 3, the user or the program selects 64 cells ($Cl_1-Cl_{64}$) to be used in logic layer 1 (S4). The number of cells in the logic layer is selected based on the number of input signals. Since there are 64 input signals, 64 cells are selected in the logic layer. Each cell generates only one output signal based on the input signals, and hence, 64 output signals are generated in each logic layer.

When selecting the logic cells in the library, the user or the program selects cells from all families, and cells with extreme demographics, i.e., number of fan-ins and size. Further, the sum of the number of fan-ins in the logic layer must equal the sum of the number of fan-outs from the previous layer. Such a requirement assures that each fan-out is connected to a fan-in of a cell in the logic layer. For example, if there are a total of 100 fan-outs, there are a total of 100 fan-ins. The "+" and "-" signs indicate the size of the cell. For example, the "+" sign indicates that the transistor channel width of the logic cell is large, whereas, the "-" sign indicates that the transistor channel width of the basic cell is small.

After the selection of the logic cell from all the families, each fan-out of the previous layer is assigned to one and only one input or fan-in of the current logic layer (S5a). In other words, the six fan-outs from bond pad 1 need not be all connected to the 6 fan-ins of the AND gate. Such assignment can be done randomly, however, the program selects the assignments to make two criteria large.

The first criterion is D-optimality. If the connections of a cell to a logic path is viewed as an experimental design, this criterion encourages balance across the library families and demographics. For example, if the assignment is done randomly, there is a chance that AND outputs of logic layer 1 tend to be connected to more AND inputs of logic layer 2. D-optimality assures that outputs of an AND cell in logic layer 1 are connected to a cell of a different family in logic layer 2, such as a NAND cell, and the outputs of the NAND cell in layer 2 are connected to a cell of a different family in the logic layer 3. Such assignments spread or balance the connections more evenly between logic layers than random assignments.

The second criterion is maximum fan-in resolution. The fan-in of the current logic layer reduces the number of possible "0" and "1" patterns of the previous layer, and this criterion assures that the number of possible patterns is not degraded. In this embodiment, there are $2^{64}$ patterns of 0's and 1's which can be inputted at the bond pads of the test device. As is well known in the boolean logic circuit art, AND cells create more 0's than 1's as outputs, whereas OR cells create more 1's than 0's as output.

If too many of the fan-outs from the bond pads are inputted into the AND cells or OR cells, the output pattern from logic layer 1 will have many 0's or 1's, respectively. Hence, logic layer 1 degrades the possible number of patterns which is inputted into logic layer 2, i.e., reduce the dimensionality of the possible patterns. If such assignments of connections are repeated in subsequent logic layers, the pattern at logic layer 20 may be all 0's or 1's, i.e., 0 dimensionality. By maximizing the fan-in resolution, the high dimensionality of the patterns can be maintained. Using these two criteria, the program assigns the connections between the fan-outs and the fan-ins.

Another method of assigning connections can be done by using a "design repair" algorithm (S5b). The design repair algorithm is described in an article entitled, "Dual Space Algorithms for Designing Space—Filling Experiments" written by the present inventor. Based on the design repair algorithm, the program starts by randomly assigning the connections between the fan-outs to the fan-ins taking into consideration the above two criteria. In other words, the program assigns the best connections based on D-optimality and maximum fan-in resolution. After a certain number of random assignments of fan-outs to fan-ins, the best of these assignments, as measured by these two criteria, is selected.

The best-of-random selection is called the R-step of the design repair algorithm. Next the program systematically considers the effect of the two criteria of exchanging each pair of fan-in-fan-out assignments, and the best is selected. The best-of-pairwise-exchanges algorithm is called the E-step of the design repair algorithm. The E-step is repeated until no further improvement of the two criteria is achieved.

Thereafter, a length of the output trace of each cell is assigned (S6). The "−" sign in FIG. 5 indicates the shortest path, whereas the "+" sign indicates a path longer than the shortest path. To make such assignments, the first criterion of D-optimality is again used. There must be a balancing of lengths such that each family of cells in the next layer tends to get half of the short lengths and half of the long lengths; cells with large fan-ins and small fan-ins would both tend to get an average of an equal number of short and long lengths; and cells with large size and small size would both equally get an average of short and long lengths.

After the assignment of the lengths, the same process is repeated for logic layer 2 and so forth, until all 20 logic layers have been designed using the CAD tool. Since there are 20 logic layers and each logic layer has 64 cells, it is possible to have every different logic cell from every family of a 1200-member cell library. To propagate the input signal in only one direction, all outputs from logic layer 1 go to logic layer 2 and outputs therefrom go to logic layer 3. In other words, outputs from the previous layer are connected only to the next logic layer. The output signal of a cell in a logic layer is not connected to any other cells of the same logic layer.

As discussed above in the conventional method for designing a integrated circuit, the user incorporates various compensating circuits, chooses logic cells with large transistor channel width (size) when there are large fan-outs or when the length between the fan-in and fan-out is large. Unlike this conventional design process, the program increases the mismatch of size fan-outs and fan-ins and does not incorporate compensating circuits. By using every cell available in the cell library and increasing the mismatch possible in designing a test structure, the test structure incorporates the extreme conditions of an integrated circuit. Using the CAD tool, signals are then applied at the 64 input bond pads ($BP_{I1}$–$BP_{I64}$) of the test structure. The CAD tool then predicts the propagation delays of the output signals at the 64 output bond pads ($BP_{O1}$–$BP_{O64}$), and the results are stored in a hard disk of the computer.

For any test structure, there are two additional means for inducing a variety of propagation delays. One is to vary the parameters of the testing environment, especially temperature, voltage, and input signal form. The second is to alter deliberately selected fabrication parameters, especially physical dimensions and/or semiconductor ion implant dose and/or energy. It is expected these strategies will also be applied to the present invention. Common practice assesses such changes in testing and fabrication of individual elements—transistors, capacitors, resistors, etc. From such elementary devices are extracted parameters. Some of these parameters are suitable as inputs to the CAD tools. For the present invention, it is anticipated that users of this invention are likely to perform such parameter extraction and refined prediction.

The designed test structure is then fabricated on a semiconductor substrate, and the fabricated test structure is packaged. Under the same conditions of the designed test structure, the same signals are applied at the input bond pads of the packaged test structure to measured the actual propagation delays of the output signals. Thereafter, the actual propagation delays are compared to the predicted propagation delays of the CAD tool.

As discussed above, the designed test structure incorporates the extreme conditions of the integrated circuit design. If the predicted propagation delays closely match the actual propagation delays of such an extreme test structure, the user can rely on the CAD tool to accurately predict the propagation delays of integrated circuits, which the user may design and fabricate for commercial purposes, since such integrated circuits have fewer mismatches. In other words, if the CAD tool can predict the propagation delays of the test structure, then the CAD tool can predict the propagation delays of other circuits. With such reliance on the accuracy of the CAD tool, there is less need for semiconductor verification of the designed integrated circuit, which decreases the cycle time for bringing integrated circuits to the commercial market.

However, there may be instances where the predicted propagation delays do not match the actual propagation delays. For example, the predicted propagation delays may be off the actual propagation delays by a factor of two. After multiple cell test structures are designed and fabricated based on the above method, and if the predicted propagation delays are consistently off the actual propagation delay for every test structure by a factor of two, such a factor can be easily taken into account when designing an integrated circuit.

There are, however, instances when the factor varies for every multiple cell test structure designed, fabricated and tested using the above methodology. In such a situation, the user analyzes the designed test structures for certain patterns based on characteristics of the cells. When the cause(s) is discovered, the user can compensate for the discrepancy, in effect recalibrating the simulation tool.

The foregoing embodiment is merely exemplary and not to be construed as limiting the basic concept of validating cell libraries. Moreover, while semiconductor integrated circuit design has been exemplified, the invention is not so limited, and can easily be applied to other circuit design, construction and testing, where validation of a library for designing a circuit is required to verify the predicted results with the actual results.

I claim:

1. A system for validating a cell library having K number of different logic cells with each logic cell exclusively belonging to one of J logic families, J and K both being positive integers with $J \leq K$, comprising:

means for forming a schematic of a test structure having N logic layers, where N is a positive integer, each logic layer having a plurality of logic cells from the cell library including at least one logic cell from each of the J logic families, outputs of logic cells in a logic layer being connected to inputs of logic cells in an adjacent logic layer;

means for testing the schematic of the test structure to predict signal processing of input signals; and means for comparing the predicted signal processing for the schematic test structure with actual signal processing measured for a fabricated test structure.

2. The system of claim 1, wherein both testing means measures propagation delays of output signals relative to the input signals.

3. The system of claim 1 further comprising:

means for determining a number of inputs and outputs of the schematic test structure based on a number of bond pads of a packaged device; and means for determining N number of logic layers based on a number of cells which process an input signal prior to generating an output signal in an integrated circuit.

4. The system of claim 1, wherein said schematic test structure forming means comprises:

means for selecting a number of fan-outs in a logic layer (L) from each output of each logic cell in a logic layer (L−1), where 0<L<N;

means for assigning a connection between each fan-out and each fan-in; and means for assigning a length to each output trace of each cell in the (L) logic layer.

5. The system of claim 4, wherein said schematic test structure forming means further comprises:

means for selecting logic cells from every logic family in the cell library based on fan-ins and size so that the schematic and fabricated test structures operate under extreme conditions.

6. The system of claim 4, wherein said connection assigning means comprises:

means for enlarging D-optimality such that a logic cell of a particular family in the (L) logic layer is connected to a logic cell of different families in the (L+1) and (L−1) logic layers; and means for maximizing fan-in resolution such that a dimensionality of patterns for input signals is maintained throughout N logic layers.

7. The system of claim 4, wherein said connection assigning means comprises:

means for randomly assigning connections between fan-ins and fan-outs;

means for exchanging an assignment of the connection between a pair of fan-ins and fan-outs; and means for controlling the randomly assigning means and exchanging means such that a logic cell of a particular family in the (L) logic layer is connected to a logic cell of different families in the (L+1) and (L−1) logic layers and a dimensionality of patterns for input signals is maintained throughout N logic layers.

8. The system of claim 4, wherein said length assigning means comprises means for balancing long, short, and optionally, intermediate lengths assigned to the logic cells in the logic layer.

9. A stored program for machine implemented generation of a schematic of a test structure from a cell library having K number of different logic cells with each logic cell exclusively belonging to one of J logic families, J and K both being positive integers with J≦K, the cell library being used to design an integrated circuit and the schematic of the test structure being used for validating the cell library to assure that a predicted signal processing for a designed integrated circuit is accurate, the program comprising:

a first routine which determines N number of logic layers for the test structure based on a number of cells which processes an input signal prior to generating an output signal in the integrated circuit;

a second routine to incorporate a plurality of logic cells for each logic layer, said plurality of logic cells for each logic layer including at least one logic cell from each of the J logic families.;

a third routine for assigning a connection between outputs of a logic layer (L) and inputs of a logic layer (L+1), where 0≦L<N;

a fourth routine for assigning a length to all outputs of the logic layer (L); and a fifth routine to repeat the second to fourth routines until L equals N.

10. The program of claim 9, wherein said first routine comprises:

a first sub-routine to determine a number of inputs and outputs of the test structure based on a number of bond pads of a package device; and a second sub-routine to determine N number of logic layers based on a number of cells which processes an input signal prior to generating an output signal in the integrated circuit.

11. The program of claim 9, wherein said second routine includes:

a first sub-routine for selecting a number of fan-outs in a logic layer (L) from each output of each logic cell in a logic layer (L−1); and a second sub-routine for selecting logic cells from every logic family based on fan-ins and size so that a number of fan-outs from the logic layer (L−1) equals a number of fan-ins of logic cells in the logic layer (L), and the test structure operates under extreme conditions.

12. The program of claim 9, wherein said third routine comprises:

a first sub-routine for enlarging D-optimality such that a logic cell of a particular family in the (L) logic layer is connected to a logic cell of different families in the logic layers (L+1) and (L−1); and a second sub-routine for maximizing fan-in resolution such that a dimensionality of patterns for input signals is maintained throughout N logic layers.

13. The program of claim 9, wherein said third routine comprises:

a first sub-routine for randomly assigning connections between fan-ins and fan-outs;

a second sub-routine for exchanging an assignment of the connection between a pair of fan-ins and fan-outs; and a third sub-routine for controlling operations of the first and second sub-routines such that a logic cell of a particular family in the logic layer (L) is connected to a logic cell of different families in the logic layers (L+1) and (L−1) and a useful dimensionality of patterns for input signals is maintained throughout N logic layers.

14. The program of claim 9, wherein said fourth routine includes a sub-routine for averaging long and short lengths assigned to the logic cells in the logic layer.

15. A machine implemented method for validating an accuracy of a cell library used to design an integrated circuit, the cell library having K number of different logic cells with each logic cell exclusively belonging to one of J logic families, J and K both being positive integers with J≦K, the method comprising the steps of:

forming N number of logic layers based on a number of cells which processes an input signal prior to generating an output signal in the integrated circuit;

assigning a plurality of logic cells in each logic layer with fan-out and fan-in connections to form a schematic of a test structure, each logic layer including at least one logic cell from each of the J logic families; and comparing predicted performance results for the schematic test structure with actual performance results of a test structure fabricated based on the schematic test structure.

16. The method of claim 15, wherein the step of forming logic layers includes the steps of determining a number of inputs and outputs of the schematic test structure based on a number of bond pads of a packaged integrated circuit.

17. The method of claim 15, wherein the step of assigning comprises the steps of:

(a) selecting logic cells from every logic family in the cell library based on fan-ins and size so that the test structure operates under extreme conditions;

(b) selecting a number of fan-outs in a logic layer (L) from each output of each logic cell in a logic layer (L−1) so that a number of fan-outs from logic layer (L−1) equals a number of fan-ins of logic cells in the logic layer (L), where $0 < L \leq N$;

(c) assigning a connection between each fan-out and each fan-in;

(d) assigning a length to each output trace of each cell in the (L) logic layer; and (e) repeating steps (a)–(d) until L equals N.

18. The method of claim 17, wherein step (c) comprises the steps of:

enlarging D-optimality such that a logic cell of a particular family in the logic layer (L) is connected to a logic cell of different families in the logic layers (L+1) and (L−1); and enlarging fan-in resolution such that a dimensionality of patterns for input signals is maintained throughout N logic layers.

19. The method of claim 17, wherein step (b) comprises the steps of:

(i) randomly assigning connections between fan-ins and fan-outs;

(ii) exchanging an assignment of the connection between a pair of fan-ins and fan-outs; and (iii) controlling steps (i) and (ii) such that a logic cell of a particular family in the logic layer (L) is connected to a logic cell of different families in the logic layers (L+1) and (L−1) and a dimensionality of patterns for input signals is maintained throughout N logic layers.

20. The method of claim 17, wherein step (d) includes the steps of averaging long and short lengths assigned to the logic cells in the logic layer.

21. The method of claim 15, wherein the comparing step comprises the steps of:

predicting propagation delays of output signal relative to input signals inputted in the schematic of the test structure;

fabricating said test structure based on the schematic;

testing the fabricated test structure to measure actual propagation delays of the output signals; and comparing the predicted and actual propagation delays of the schematic and fabricated test structures, respectively.

* * * * *